March 17, 1931. H. E. IVES 1,796,931
ELECTROOPTICAL TRANSMISSION
Filed July 2, 1927  2 Sheets-Sheet 1

INVENTOR
HERBERT E. IVES
BY
ATTORNEY

March 17, 1931.     H. E. IVES     1,796,931
ELECTROOPTICAL TRANSMISSION
Filed July 2, 1927     2 Sheets-Sheet 2
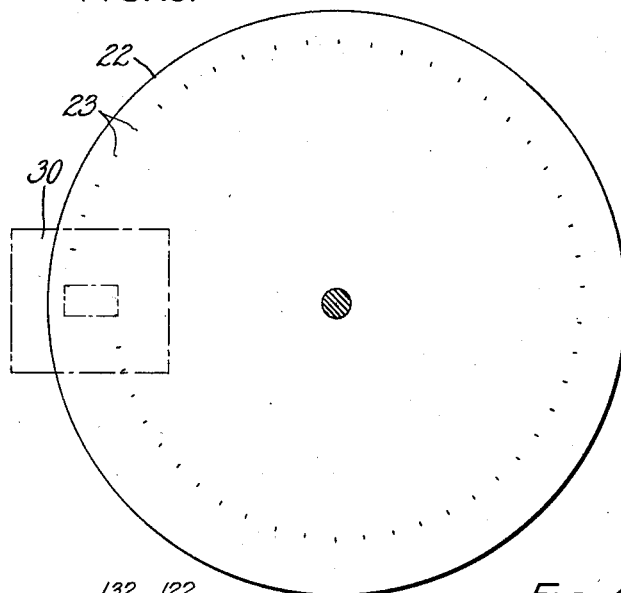
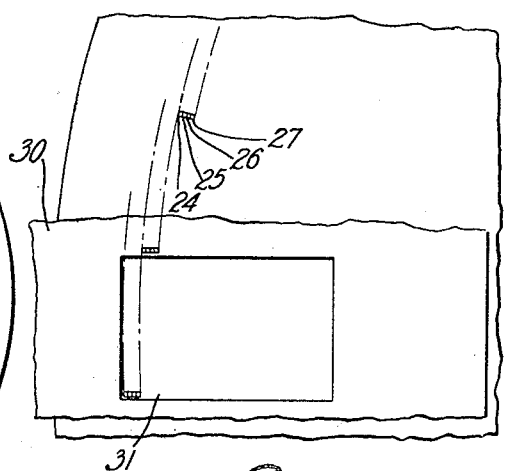
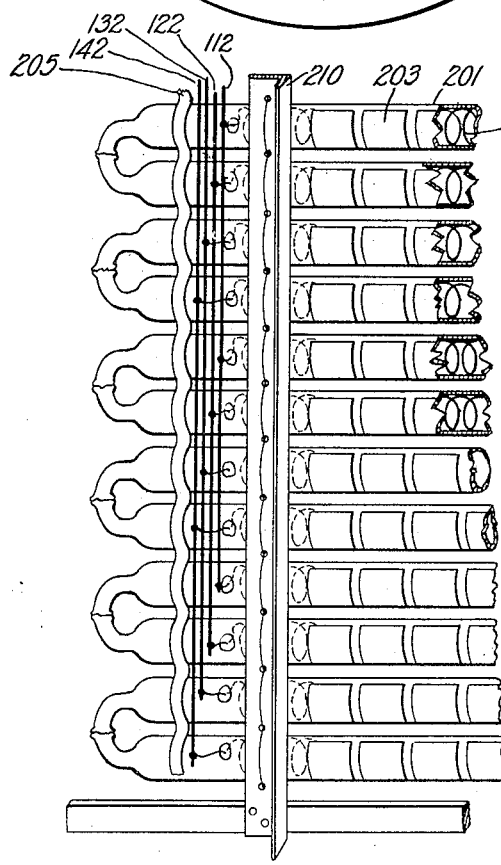
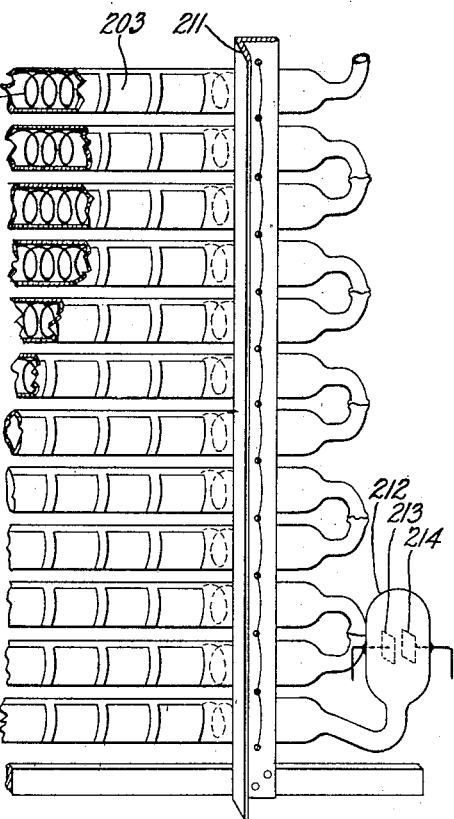
INVENTOR
HERBERT E. IVES
By O. H. Sprague
ATTORNEY Patented Mar. 17, 1931

1,796,931

UNITED STATES PATENT OFFICE

HERBERT E. IVES, OF MONTCLAIR, NEW JERSEY, ASSIGNOR TO BELL TELEPHONE LABORATORIES, INCORPORATED, OF NEW YORK, N. Y., A CORPORATION OF NEW YORK

ELECTROOPTICAL TRANSMISSION

Application filed July 2, 1927. Serial No. 203,045.

This invention relates to electro-optical transmission and more particularly to the electrical production of images of moving objects or pictures.

In a television system such as that disclosed in the copending application of Frank Gray, Serial No. 227,649, filed Oct. 21, 1927, the object whose image is to be produced electrically is illuminated point by point by an intense beam of light passing through apertures in a rotating disc. Reflected light from the object falls upon a photoelectric cell and is translated into electric current varying in amplitude in accordance with the varying reflecting power of the object from point to point. Successive scannings take place within the period of the persistence of vision which is about one-sixteenth of a second. The resulting current has frequency components lying within a range from 0 to 20,000 or more cycles per second, of which components it is essential to transmit a major portion, say from 10 to 15 cycles and up, the range required being dependent upon the degree of resolution to be obtained in the produced image and the size of the object.

In accordance with the present invention there is provided a multi-channel system and method utilizing the principles of a system of the kind just described. In the preferred form of the invention a plurality of light beams having distinctive characteristics such, for example, as distinctive colors, or groups of wave lengths, are employed for simultaneously scanning the field of view and means are associated with the light sensitive devices, such, for example, as light filters, for selecting portions of the light reflected from the field of view and utilizing it to set up separate electric currents which control separate transmission channels. As compared with the Gray system above mentioned the present system enables the scanning of a larger object or field of view, or the obtaining of a greater degree of resolution with the same size of field of view.

In the embodiment selected for illustrating the invention, an object whose image is to be produced is scanned simultaneously by several beams of light projected through a rotating scanning disc and each beam of light comprises a different spectral band whose wave lengths are sufficiently different to constitute separate scanning channels for each band. Each beam illuminates an elemental area of the object individual thereto and the reflected light from the object activates selective light sensitive cells, one cell or one group of cells being responsive to each spectral band. Each scanning light beam constitutes a separate light channel which in turn, through the selectivity of the light sensitive device, controls its own photo-electric transmission channel. The scanning operations are thus simultaneously carried on by several bands of light having mutually exclusive wave lengths thereby forming distinct channels, each of which in turn excites only its respective light sensitive cell or group of cells. Each of these cells is associated through suitable amplifying devices with a transmission channel. The different spectral bands constituting the scanning beams may have a difference in wave length such that each band appears to the eye as a different color, but the fact that these bands may appear as different colors should not confuse this arrangement with that of a color picture or television transmission system.

At the receiving station each transmission channel is connected through suitable terminal apparatus to a multiple unit glow discharge lamp, this lamp being preferably of the grid type, certain sections representing the different channels being positioned adjacent to one another so as to occupy the viewing field in harmony with that of the scanning operations at the transmitting station. Different groups of sections of the glow discharge receiving lamp are operated by the different transmission channels. All emit light of substantially the same color varying only in intensity substantially in accordance with the excitation.

The light sensitive devices at the transmitting station must each be selectively sensitive to certain wave length bands or colors. This selectivity may be obtained either by placing light filters in front of the cells or by making the cells inherently selective.

Each channel produces its proportional part of the produced image, and in order to cause the different parts of the image corresponding to the electrical energy transmitted by the different channels to have as nearly as possible the same tone values, suitable arrangements are made for adjusting the amplification and other factors of the electrical circuit of each channel. The term light as used herein includes not only wave lengths within the so-called visible spectrum but also radiation having longer or shorter wave lengths, and it follows that the terms illumination and illuminating are similarly used. The term color is used to indicate a limited portion of the spectral band of wave lengths.

A more detailed description of the invention follows and is illustrated in the accompanying drawing.

Fig. 2 is a side view of the scanning disc.

Fig. 3 is a side view of a fragmentary portion of the scanning disc showing particularly the arrangement of the filters in its apertures.

Fig. 4 is a partial detailed rear view of a grid type multiple electrode glow discharge lamp showing the arrangement of the interconnected tube sections and the electrodes associated with the tube.

Fig. 5 is a cross section of one of the tubes of the glow discharge lamp.

Figure 1:
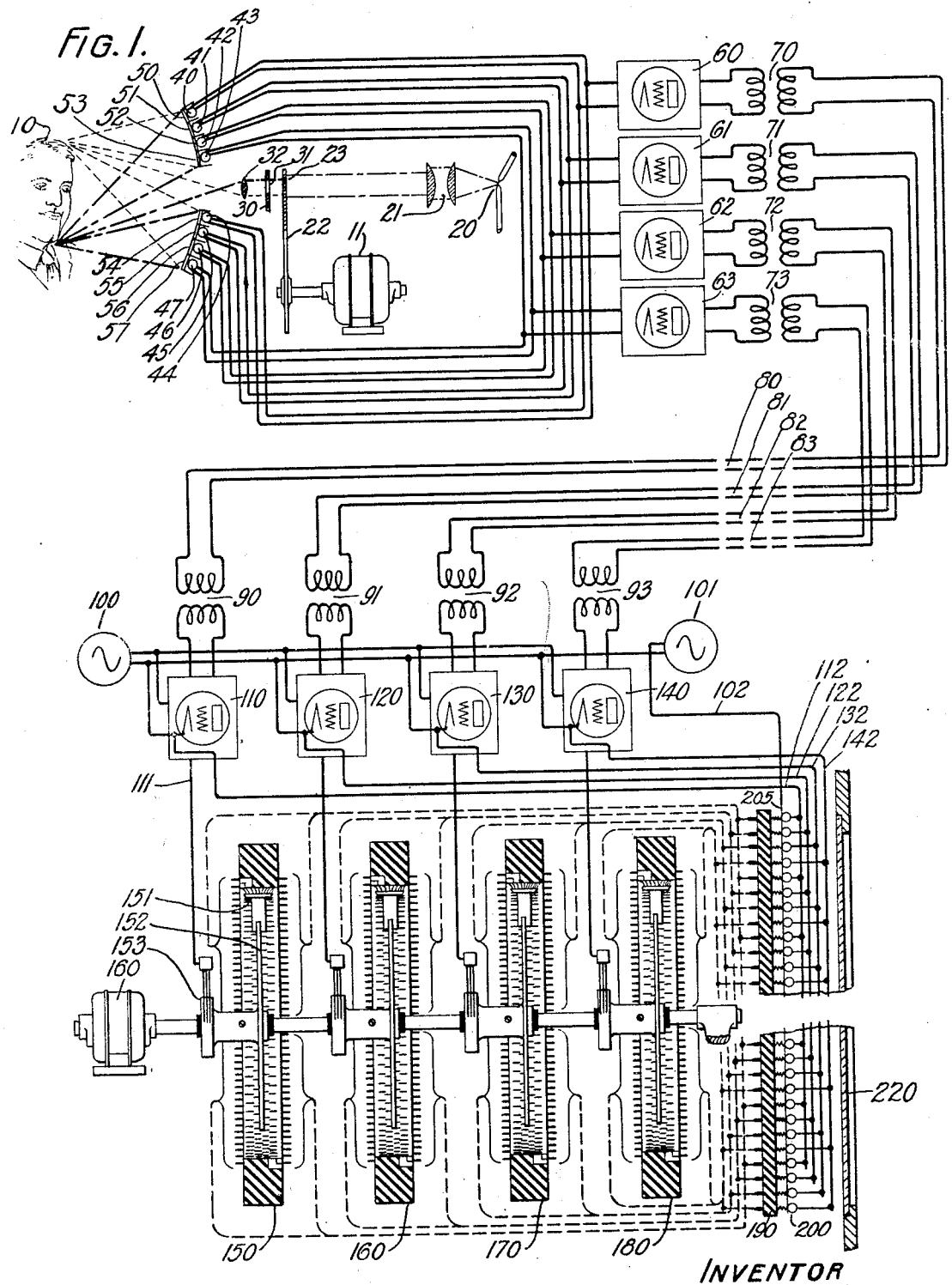
Fig. 1 is a schematic representation of a television system selected for illustrating this invention.

Referring to Fig. 1, the scanning apparatus at the transmitting station includes a light source 20 whose light is directed by means of lenses 21 upon the scanning area of a scanning disc 22. The path of the scanning light from the light source is through one of the apertures 23 in the scanning disc, the apertured screen 30, whose opening is so dimensioned that the light coming through only one aperture in the disc 22 can at any instant pass, and a lens 32, to the object 10 whose image is transmitted. Each of the apertures 23 in the scanning disc contains a number of light filters for the purpose of dividing the light into a number of spectral bands or channels, the details of which will be explained later. As the scanning disc rotates, a small beam of intense light, divided into a number of spectral bands or channels, passes successively through each one of its apertures and scans, in a series of parallel paths, the object whose image is transmitted. Resulting diffused reflected light from each elemental area of the object is successively impressed upon a plurality of selective light sensitive translating devices 40, 41, 42, and 43, one for each spectral band or channel, each connected with an individual transmission channel, thereby simultaneously setting up current variations in each channel in accordance with the light tone values of the elemental areas of the object. Further details of a single channel scanning and light translating arrangement applicable to this system are shown in the copending application of Frank Gray, Serial No. 227,649, filed October 21, 1927, supra. A suitable synchronizing system is disclosed in the patent to H. M. Stoller and E. R. Morton, 1,763,909, July 17, 1930.

As above stated the light upon passing through the apertures in the scanning disc is divided into a number of spectral bands or channels having different wave lengths or colors. The arrangement for accomplishing this is shown more in detail in Figs. 2 and 3. The scanning disc 22 contains a plurality of small rectangular apertures 23 spirally arranged. Each aperture is divided by a number of light filters 24, 25, 26, and 27, each passing its own exclusive spectral band or bands. These filters are arranged side by side in a radial line, and cause the light of different wave lengths or colors passing through them to sweep over the object in a series of parallel paths. While filters for four different light bands are here shown this number may be either decreased or increased. The relation of the apertures through the scanning disc and the opening 31 in the fixed screen 30 is such that upon one revolution of the scanning disc all elemental areas of the object being scanned are successively illuminated by the different spectral bands, each one covering its proportionate part of the total field. The selective light sensitive cells 40, 41, 42, and 43 are either inherently selective or the same effect is secured by positioning light filters 50, 51, 52, and 53 between the cells and the object 10. The characteristics of these light filters or of the cell are similar to those of the filters 24, 25, 26 and 27 in the apertures in the scanning disc with the result that light passing through filter 24 activates light sensitive cell 40, light passing through filter 25 activates light sensitive cell 41, light passing through cell 26 activates light sensitive cell 42, and light passing through filter 27 activates light sensitive cell 43. A plurality of groups of selective light sensitive cells may be used and a second group 44, 45, 46 and 47 with their respective filters 54, 55, 56 and 57 are shown. The light sensitive cells responsive to the same spectral band are electrically connected to the same channel. The light sensitive cells responsive to a group of spectral bands and controlling the different channels are positioned close together so as to view the object through as small an angle as practicable in order to prevent the separate channels producing their part of the received picture as though the object were illuminated by differently located light sources, though the light sensitive cells responding to a group of spectral bands each of large size and area, and as a whole, receive light from an object through a wide angle, as pointed out in the copending application of Frank Gray, Serial No. 227,649, filed October 21, 1927, supra. The plurality of channels originates with the division of the scanning beam into a number of spectral bands by the light filters in the apertures of the scanning disc. From the scanning disc the several channels are transmitted as spectral bands illuminating their own respective elemental area of the object. The reflected light from each elemental area so illuminated irrespective of the spectral band illuminating it impinges upon each of the selective light sensitive cells, but the light sensitive cells are activated only by the light to which they are sensitive. At the selective light sensitive cells the light energy in accordance with the reflective power of the elemental area of the object being scanned is translated into electric current. The electric current from each group of selective light sensitive cells is amplified and controlled by suitable amplifiers 60, 61, 62 and 63, one for each channel. These amplifiers are arranged so that the amount of amplification can be adjusted as desired for each channel and thus permit adjusting the output current from all channels to the proper strength irrespective of any difference in response due to the use of different spectral bands in the scanning process. The several channels are connected through the repeating coils 70, 71, 72, and 73 with the transmission lines 80, 81, 82, and 83, respectively. The several transmission lines are connected with the receiving apparatus through the repeating coils 90, 91, 92 and 93, respectively.

The incoming picture or signal current over the several channels is impressed upon separate receiving amplifier and control networks for each channel. The transmitted current in the arrangement shown is an alternating current of varying amplitude representative of light variations above and below the average tone value of the object being scanned. The advantages of employing current of this kind and further details of apparatus for its production are disclosed in the copending application of H. E. Ives and Frank Gray, Serial No. 181,511, filed April 6, 1927.

The incoming alternating signaling current received from each transmission channel is impressed upon its respective amplifier and control circuit 110, 120, 130, and 140 and is caused to modulate a high frequency oscillating current generated by the oscillator 100. The modulated high frequency current controlled by each channel is next passed through commutator distributors 150, 160, 170, and 180, for each of the respective channels and from these distributors to the multiple electrode glow discharge receiving lamp 200. The receiving amplifier and control networks 110, 120, 130, and 140 and the several distributor commutators are similar to those shown for a single channel system in the patent to Frank Gray, No. 1,759,504, May 20, 1930. The viewing field at the receiving station is illuminated by a large multiple electrode glow discharge lamp, one electrode being employed for each elemental area of the field. The distributor commutators contain one contact for each element or individual electrode of the glow discharge lamp and connection is made between them by individual wires. Each distributor commutator at any instant connects with only one electrode on the glow discharge lamp and thereby limits the illumination to the elemental area defined by the connected electrode. In this system the several channels are simultaneously operated and a plurality of elemental areas of the receiving lamp are simultaneously illuminated equaling the number of channels simultaneously operated. Each distribtor commutator has a rotating brush and the brushes of all distributors are mounted upon a single shaft which is driven in synchronism and in phase with the scanning apparatus by means of the driving motor element 103.

The electrical circuits for the picture producing current flowing through the glow discharge lamp is from an individual electrode on the lamp, each of which is connected with an individual contact in the distributor commutator, to the common electrode of the lamp. The multiple electrode glow discharge lamp is divided in accordance with the several channels by grouping the sections of each channel with its respective commutator distributors and connecting the common electrode of the different sections to a common electrode connected with the proper channel. The common conductors 112, 122, 132, and 142 may group the various tube sections according to channels and in turn connect with the receiving circuit networks 110, 120, 130, and 140, respectively, of the various channels. The arrangement of the connections between the commutator distributors and the sections of the glow discharge lamp and of the common electrode of each section of the glow discharge lamp so as to uniformly distribute the sections associated with each channel preferably provides for connecting every fourth tube section, since four channels are shown, to its respective channel. This arrangement of the connections is shown in both Fig. 1 and Fig. 2.

The current for the modulated high frequency picture current may be traced for one channel from the receiving circuit network 110, conductor 111, slip ring 153, brush arm 152, distributor brush 151, one of the contacts in the commutator distributor 150, one of the individual lead wires from such contact to an individual connection through the multiple contact panel 190 to an individual electrode on the glow discharge tube 200 and common return lead 112, back to the receiving circuit network 110. A similar circuit may be traced in connection with each of the other channels. As many individual wires connect between the commutator distributors contacts and the glow discharge lamp as there are individual electrodes on the lamp though in the drawing this plurality of wires is shown by a few single lines for simplicity.

The glow discharge lamp in the arrangement shown is operated by a modulated high frequency current, and in order to prevent lag in the action of the picture current applied to the individual electrodes of the lamp, the gas in the tube is excited by means of an auxiliary high frequency current continuously applied at a point in the various tube sections outside of the field of view. This second high frequency current may be supplied from a high frequency oscillator 101. One terminal of this oscillator connects by means of the conductor 102 to the auxiliary electrode 205 on each tube section of the glow discharge lamp 200 while the other terminal of the oscillator connects through the receiving circuit networks of the several channels with the common electrodes in the blow discharge lamp through the several lamp common return conductors 112, 122, 132, and 142. The response of a glow discharge lamp is much more sensitive to starting and to small current variations if the lamp is already under excitation when the signal current is impressed thereon, and this fact is taken advantage of by continuously exciting the lamp through a special set of electrodes so arranged as to avoid interfering with the luminosity of the viewing screen. A large panel of ground glass 220, positioned closely in front of the glow discharge lamp 200, forms a picture receiving or viewing surface. This may, however, be omitted when the audience is a considerable distance from the glow discharge lamp.

A multi-channel system of four channels has been shown and described but this number may be increased or decreased. The operation of each channel is substantially the same as any other channel and the apparatus used in each channel may be in most respects substantially the same as that disclosed in a copending application of Frank Gray, Serial No. 181,537, filed April 6, 1927, supra.

The glow discharge lamp 200 is shown in detail in Fig. 4. The gas containing chamber is composed of a plurality of glass tubes closely positioned parallel to each other in a flat grid-like formation connected in series with each other at their ends thus forming a continuous chamber in which the gas pressure is the same throughout and one which may cover a large area and at the same time withstand atmospheric pressure without having the walls of the chamber unduly thick. The various tube sections of the tube are fastened by a lacing or other suitable means to the left and right supporting members 210 and 211. Each tube section 201 has an internal common electrode 202 which may be in the form of an open spiral conductor extending throughout the length of a section, and a plurality of spaced individual exterior electrodes 203 fixed along the exterior rear side of the tube sections. These exterior electrodes may be made of tinfoil or other suitable conducting material cemented to the tube section. They extend circumferentially about 180°, and longitudinally along the tube a length about equal to the diameter of the tube, and thus have a front or projected area which may be square. Each electrode is separated to insulate it from the adjoining electrodes by a distance which may be a small fraction of its length. The adjoining tube sections are positioned in such proximity to each other that the exterior individual electrodes appear uniformly spaced throughout the entire area covered by the tubes. The interior common electrode of each tube section is brought out at one end through a seal and connected to one of the common conductors 112, 122, 132, or 142 in a manner to group the various sections into channels as heretofore described. A special or auxiliary set of exterior electrodes 205 associated with all of the tube sections forms a common connection to all. This connection is used for continuously energizing each section of the lamp by passing a high frequency oscillating current from it across the end of each section to the interior common electrodes 202 to maintain a condition of excitation of the tubes which substantially eliminates lag in the response of the lamp when the individual electrodes are energized by the signal current.

A gas purifying chamber 212 is attached to the tube. This purifying chamber contains two small electrodes 213 and 214, made of such material as pure magnesium, which are connected to a suitable source of electric current by leads sealed through the sides of the chamber. If a direct current having a voltage of the order of 150 volts is applied across these terminals a discharge takes place which causes purification of the gas within the lamp in a well-known manner.

A cross section of one of the tube sections of the lamp is shown in Fig. 5. The relative positions of the common internal electrodes 202, the wall of the tube sections 201 and the individual external electrodes 203 are clearly shown in this drawing.

The apparatus and the operation of this multi-channel system is very similar to that of a single channel system multiplied by the number of channels employed. In the multi-channel system, however, obviously certain apparatus serves all channels. The positioning of the portion of the image transmitted by each channel in the viewing screen is such that at each instant the several elemental areas being scanned appear close together, since in scanning the object the several light channels operate on adjacent elemental areas of the object. For a given degree of resolution in the produced image both the speed of scanning and the width of the frequency band are reduced, or for a given speed of scanning the degree of resolution is increased.

As each channel produces its proportional part of the produced image provision is made, as heretofore stated, for adjusting the apparatus so that the electrical energy transmitted by the different channels have as nearly as possible the same tone values. With strongly colored objects it may be inevitable that there will be some structure of the spacing of the large slots used in the transmitting scanning disc due to the unusual excitation of certain colors on certain channels. This, however, may be largely obviated by the use of color filters each of which transmit several bands of the spectrum for each channel, the bands of the various filters, being mutually exclusive. Each channel in such an arrangement will thus be activated by two or more narrow spectral bands distributed over different parts of the spectrum, and will consequently reduce any unbalancing effect which might be caused from strongly colored objects acting on channels sensitive to one narrow band of the spectrum.

While the invention has been described with special reference to a multi-channel television system employing means for receiving reflected light through a wide solid angle, certain features of the invention are of more general application, as will appear from the appended claims.

What is claimed is:

1. In an electro-optical system, scanning means including means for simultaneously illuminating spot by spot separate portions of a field of view whose image is to be produced electrically, means for producing separate electrical energies each having a characteristic corresponding to the reflecting power of the successively scanned spots of one of the illuminated portions, means for transmitting energies corresponding to those representing the respective portions of the field of view without interference therebetween which would prevent subsequent separation of these energies, means utilizing the transmitted energies to produce an image of the field of view, means for causing each of the plurality of illuminated spots to move with such velocity that the entire field of view is illuminated within the period of the persistence of vision, and a light sensitive device for receiving the light reflected within a large solid angle.

2. In an electro-optical image producing system, scanning means comprising means for simultaneously illuminating spot by spot with light from different parts of the spectrum separate portions of a field of view whose image is to be produced electrically, and means for producing separate electrical energies each having a characteristic corresponding to the reflecting power of the successively scanned spots of one of the illuminated portions.

3. In an electro-optical image producing system, means for scanning, comprising means for simultaneously illuminating spot by spot with a plurality of bands of light from different parts of the spectrum separate portions of a field of view whose image is to be produced electrically, light sensitive devices individually sensitive to light from the different portions of the spectrum for translating the light characteristics of the field of view into separate electrical energies, means for transmitting the said energies corresponding to the separate portions of the field of view without interference therebetween which would prevent the subsequent separation of these energies, and means utilizing the transmitted energies to produce an image of the field of view.

4. A television system comprising means for simultaneously scanning a field of view with a plurality of light beams having different wave lengths, said beams being juxtaposed so that each beam scans substantially equal portions of the field of view and scans its proportionate share of the entire field of view in each scanning cycle, and means cooperating with said scanning means for producing an image of the field of view.

5. In an electro-optical image producing system, a source of light, a scanning disc having spirally arranged apertures, means to segregate and transmit beams of light of different wave lengths through different portions of said apertures, said apertures being so arranged that upon rotation of the scanning disc the transmitted light beams of different wave lengths move in juxtaposed relation to each other in the same corresponding wave length arrangement as the apertures pass the scanning field and thereby illuminate the said field by successive series of bands of light of different wave lengths.

6. An electro-optical image producing system comprising a source of light, means for analyzing said light into different colors and for simultaneously illuminating successive elemental areas of a field of view by spots of light of the said different colors, a corresponding number of selective light sensitive cells so positioned that reflected light from the several spots of light impressed on said field of view impinges upon the said cells, each of which is sensitive to only one of the said light colors and translates into electrical energy the light effects of the field of view to which it is sensitive, and a separate transmission channel for each type of selective light sensitive cell.

7. An electro-optical image producing system comprising a source of light, means for analyzing said light into different spectral bands, means for causing beams of light of said spectral bands to simultaneously scan successive elemental areas of a field of view by spots of light from the different spectral bands, groups of selective light sensitive cells positioned in the paths of the light reflected from the spots of light upon the said field of view, each group of said cells being selective to only one of the said spectral bands, and a separate transmission channel for each group of similarly selective cells.

8. In a multiple channel electro-optical image producing system, receiving circuits for each channel, distributors for each channel, multiple electrode receiving lamp elements for each channel, and means for causing the said receiving lamp elements to successively cooperatively emit light in a common viewing field to produce an image corresponding to the combined excitation impressed upon each receiving circuit.

9. The method of producing electro-optical electric currents by successive selective illumination of small portions of the total area of a field of view, which method comprises successively illuminating elemental portions of elemental strips of the field of view by means of light of different wave lengths, respectively, and translating the light effects of the elemental area illuminated by light of different selective wave lengths into corresponding electric current variations.

10. The method of producing electric currents electro-optically which comprises successively illuminating elemental portions of elemental strips of a field of view by means of juxtapositioned beams of light of different wave lengths, respectively, and translating the light effects of the elemental areas illuminated by light of different wave lengths into corresponding electric current variations.

11. In an electro-optical image producing system, the method of scanning which comprises simultaneously illuminating at each instant a plurality of different elemental areas of a field of view by a plurality of moving beams of light, respectively, each beam having a distinctive characteristic.

12. In an electro-optical image producing system, the method of multiple channel scanning which comprises simultaneously illuminating at each instant a plurality of different elemental areas of a field of view by a plurality of moving beams of light, respectively, each beam having a distinctive characteristic and translating the light effects of the elemental areas illuminated by the said beams having different characteristics into separate electric effects and controling separate transmission channels respectively thereby.

13. In an electro-optical image producing system, the method of increasing the photoelectric response in scanning a field of view which comprises simultaneously selectively illuminating at each instant a plurality of different elemental areas of a field of view by light having a distinctive characteristic for each of the said elemental areas simultaneously illuminated, and simultaneously activating a plurality of selective light sensitive devices equal in number at least to the elemental areas simultaneously illuminated and each responsive to light reflected from only one of said elemental areas selectively illuminated.

14. In an electro-optical image producing system, means for scanning comprising means for simultaneously selectively illuminating at each instant a plurality of different elemental areas of a field of view by beams of light of distinctive characteristics, respectively.

15. In an electro-optical image producing system, means for scanning comprising means for simultaneously illuminating a plurality of different small portions of a field of view, whose image is to be produced, by beams of light and progressively moving said beams of light over different portions respectively of said field, and means including light sensitive translating material for gathering reflected light over a wide solid angle and translating it into electric current.

16. In an electro-optical image producing system, means for scanning comprising means for simultaneously illuminating a plurality of different elemental areas of a field of view, whose image is to be produced, by beams of light and progressively moving said beams of light over different portions respectively of said field, light sensitive translating means equal to the number of elemental areas simultaneously illuminated positioned in the paths of, and covering wide solid angles of, the light reflected from the illuminated elemental areas of the said field, and means for limiting the instantaneous activation of each of the said translating means to that produced by light in accordance with the light tone values of one of the elemental areas simultaneously illuminated.

17. In an electro-optical image producing system a moving scanning member comprising light filters for simultaneously selecting from composite light and for directing at each instant a plurality of spectrally mutually exclusive light beams upon different elemental areas of a field of view.

18. In an electro-optical image producing system, means for scanning comprising means for simultaneously illuminating a plurality of different elemental areas of a field of view, each with light from a different part of the spectrum and a plurality of selective light sensitive translating means equal in number to the number of elemental areas simultaneously illuminated and positioned in the path of reflected light from the illuminated elemental areas and each sensitive to light reflected from only one of said elemental areas.

19. An electro-optical image producing system comprising a multi-apertured moving scanning member, each of said apertures having a light filter individual thereto, the transmission characteristics of some of said filters being different from others, and means for causing a plurality of said apertures which have filters of different transmitting characteristics to be simultaneously effective in scanning.

20. An electro-optical image producing system comprising an apertured moving scanning member, each of said apertures being equipped with a light filter, and means for causing light passing through the different apertures and their associated filters to scan different traces respectively of a field of view.

21. In an electro-optical image producing system, means for scanning comprising means for simultaneously illuminating a plurality of different elemental areas of an object by beams of light of distinctive wave lengths, means for causing reflected light from each of said elemental areas to generate distinctive photoelectric currents, and means for equalizing the said photoelectric currents to compensate for varying efficiencies of the different beams of light in generating corresponding photoelectric currents.

22. A electro-optical image producing system comprising means for scanning, including means for simultaneously illuminating spot by spot separate portions of a field of view whose image is to be produced electrically, means for producing separate electrical energies each having a characteristic corresponding to the reflecting power of the successively scanned spots of one of the illuminated portions of the field of view, the said scanning means producing scanning beams having different characteristics which permit subsequent separations of the corresponding modulated energies.

23. The method of multiple channel television which comprises simultaneously moving a plurality of narrow beams of light corresponding to the number of channels progressively over a field of view in which different elemental surface areas therein to be scanned are in different planes and at different distances from the source of light and gathering reflected light from within a relatively large solid angle upon a plurality of light sensitive elements so that the shadows in the image produced by the shadowing effect of the nearer reflecting elemental surfaces of the field of view upon the more remote appear as though light were emitted by the said light sensitive elements and the field of view were viewed from the point from which the light beams emanate.

24. The method of multiple channel television which comprises moving a plurality of narrow beams of light corresponding to the number of channels progressively over a field of view in which different elemental surface areas therein to be scanned are in different planes and at different distances from the source of light and gathering reflected light from within a relatively large solid angle upon a plurality of separated light sensitive surfaces associated with each of the respective channels so that the shadows in the image produced by the shadowing effect of the nearer reflecting elemental surfaces of the field upon the more remote appear as though light were simultaneously emitted from each of the said light sensitive surfaces and the field were viewed from the point from which the light beams emanate.

25. A multiple channel television system comprising means for producing a plurality of narrow beams of light corresponding to the number of channels, means for progressively moving said beams over a field of view in which different elemental surface areas therein to be scanned are in different planes and at different distances from said source of light, and means for gathering reflected light upon a plurality of mutually exclusive light sensitive elements, the amount of light gathered at any instant from one side of a plane passing through a line extending from the center of the field of view to the source of light being greater than that from the opposite side of said plane, whereby the image has the appearance of being illuminated from a plurality of separated light sources of different intensity.

26. Means for successively illuminating the elemental areas of a three-dimensional field of view with light of different colors, and receiving means for receiving composite light made up of light of all of said colors reflected from said areas over a wide solid angle, said receiving means comprising means for selecting color components of said composite light and separately utilizing said components to set up electric currents.

27. In an electro-optical image producing system, the method of scanning which comprises simultaneously illuminating at each instant a plurality of different elemental areas of a field of view by a plurality of moving beams of light each having a substantially quadrilateral cross-section and each beam having a distinctive characteristic.

In witness whereof, I hereunto subscribe my name this 30th day of June, A. D. 1927.

HERBERT E. IVES.